(12) United States Patent
Ko

(10) Patent No.: US 8,292,452 B2
(45) Date of Patent: Oct. 23, 2012

(54) SOLAR POWER ALARM LAMP

(76) Inventor: Joseph Y. Ko, Irvine, CA (US)

( * ) Notice: Subject to any disclaimer, the term of this patent is extended or adjusted under 35 U.S.C. 154(b) by 374 days.

(21) Appl. No.: 12/795,194

(22) Filed: Jun. 7, 2010

(65) Prior Publication Data

US 2011/0299272 A1    Dec. 8, 2011

(51) Int. Cl.
*F21L 4/08* (2006.01)
(52) U.S. Cl. ........................ 362/183; 362/184
(58) Field of Classification Search .................. 362/183, 362/184, 196
See application file for complete search history.

(56) References Cited

U.S. PATENT DOCUMENTS

| 4,882,567 | A | * | 11/1989 | Johnson | 340/522 |
| 6,188,318 | B1 | | 2/2001 | Katz et al. | |
| 7,679,509 | B2 | | 3/2010 | Royer | |

* cited by examiner

*Primary Examiner* — David V Bruce
(74) *Attorney, Agent, or Firm* — Muncy, Geissler, Olds & Lowe, PLLC

(57) ABSTRACT

A solar power alarm lamp includes a support post, an alarm device connected to the support post and a lamp set connected to the alarm device. The support post includes an insertion leg insertable into the ground. The alarm device and the lamp set have respectively a first solar panel and a second solar panel. The alarm device includes a circuit board which contains a PIR sensor, a microwave sensor and a buzzer to send out an alarm. The solar power alarm lamp thus formed can be inserted anywhere outdoors through the insertion leg. The first and second solar panels can convert solar power into electric power required by the alarm device and lamp set. The invention is simple to install and also does not need external electric power.

14 Claims, 8 Drawing Sheets

SOLAR POWER ALARM LAMP

FIELD OF THE INVENTION

The present invention relates to a solar power alarm lamp and particularly to a solar power alarm lamp that converts solar power into electric power to be a power source.

BACKGROUND OF THE INVENTION

Conventional burglar alarm devices generally use various types of sensors to detect intrusion of external objects, then determine whether to send out alarm signals through sound or light to avert intrusion or scare intruders. At present, a dual sensing technology has been developed that functions by incorporating a microwave sensor and a passive infrared (PIR) sensor with mating software.

For instance, U.S. Pat. No. 6,188,318 discloses a dual-sensing intrusion detection device for detecting an intruder that comprises a PIR sensor and a microwave sensor. The device comprises PIR processing means and microwave processing means, means for summing the processed PIR signal with the processed microwave signal to generate a summed signal, and means for comparing the summed signal to a sum threshold value to determine if an alarm condition exists. The sum threshold value is selected for optimal discrimination between a human intruder and an animal presence. An additional feature of the intrusion detection device is the generation of a PIR difference signal. This feature allows the device to compensate for the limited bandwidth of the PIR sensor and to be more sensitive to a human intruder. The processing of the sensor signals includes an integration technique that sums the amplitude values of the signal and causes the sum to decay at a slow rate. In addition, the slow decay rate causes the signal to be spread out in time, thereby allowing the signals from both detectors to be above the threshold at the same time.

U.S. Pat. No. 7,679,509 also discloses a Doppler microwave system which is capable of detecting an object range and adjusting the sensitivity of the PIR detector to account for object size and range. Multiple range limited MW stages may be configured for different ranges to determine the general range of the moving object. Based on signal levels present on these MW stages, an approximate object range is determined. The sensitivity of the PIR is then adjusted based on a PIR sensitivity vs. object range function that is optimized to alarm on humans and ignore small animals and insects.

SUMMARY OF THE INVENTION

The primary object of the present invention is to provide a solar power alarm lamp that provides illumination and burglar alarm functions, and also is easy to install and can save energy.

To achieve the foregoing object, the solar power alarm lamp according to the invention includes a support post, an alarm device connected to the support post and a lamp set connected to the alarm device. The support post has an insertion leg insertable into ground and an extended section connecting to the insertion leg. The alarm device includes a casing coupled to the extended section and a circuit board held in the casing. The circuit board has a PIR sensor, a microwave sensor and a buzzer to send out an alarm. The casing is pivotally coupled with a lid which holds a first solar panel. The lid is pivoted against the casing to an open position and allows the first solar panel to receive solar power and convert the solar power into electric power. The lamp set includes a first lamp holder to couple with the alarm device, a lamp shade mounted onto the first lamp holder and a second lamp holder located on the lamp shade. The first and second lamp holders have respectively a lighting element located thereon. The second lamp holder has a bracing dock to hold a second solar panel.

By means of the construction set forth above, the invention can be assembled quickly and easily by inserting the support post in the ground. The first and second solar panels can convert solar power into electric power used by the solar power alarm lamp without supplying external electric power, thus can save energy and also is eco-friendly.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
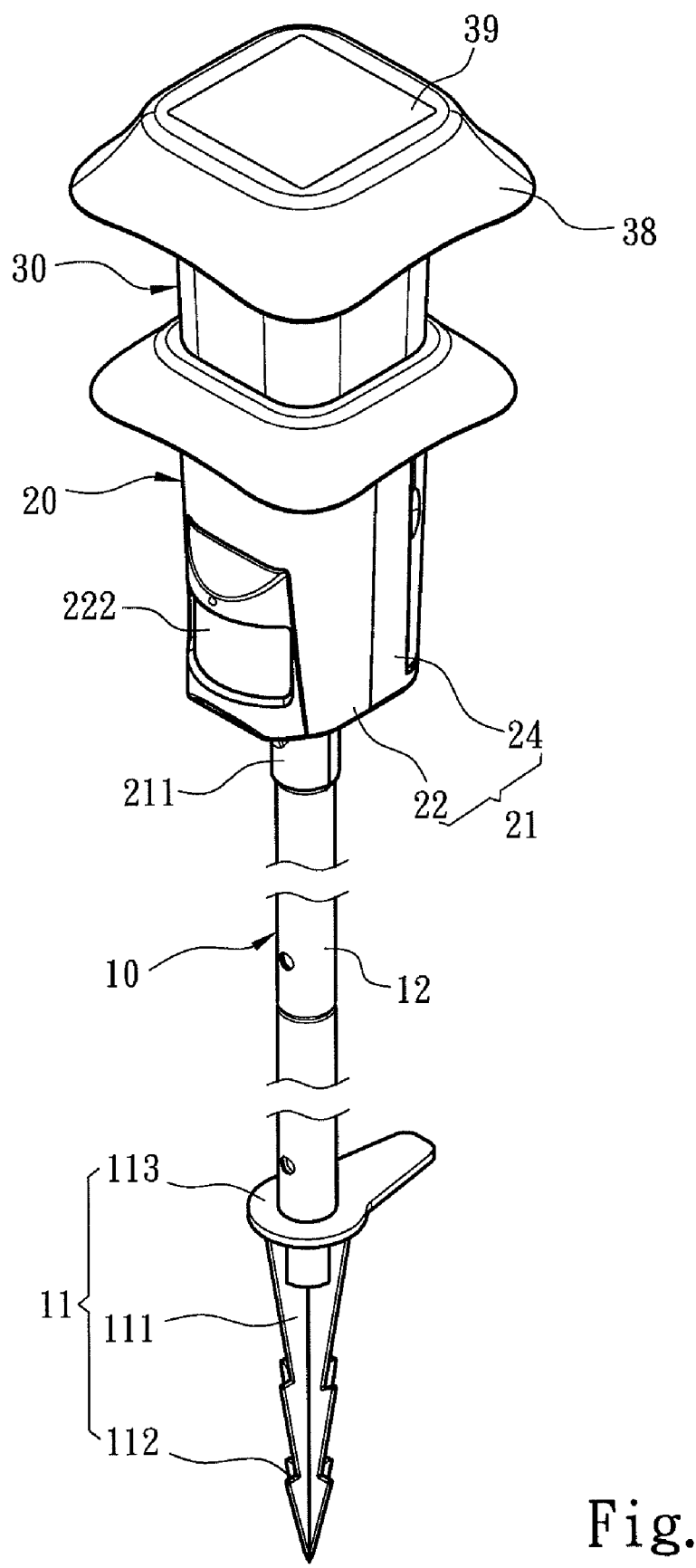
FIG. 1 is a perspective view of the invention.
Figure 2:
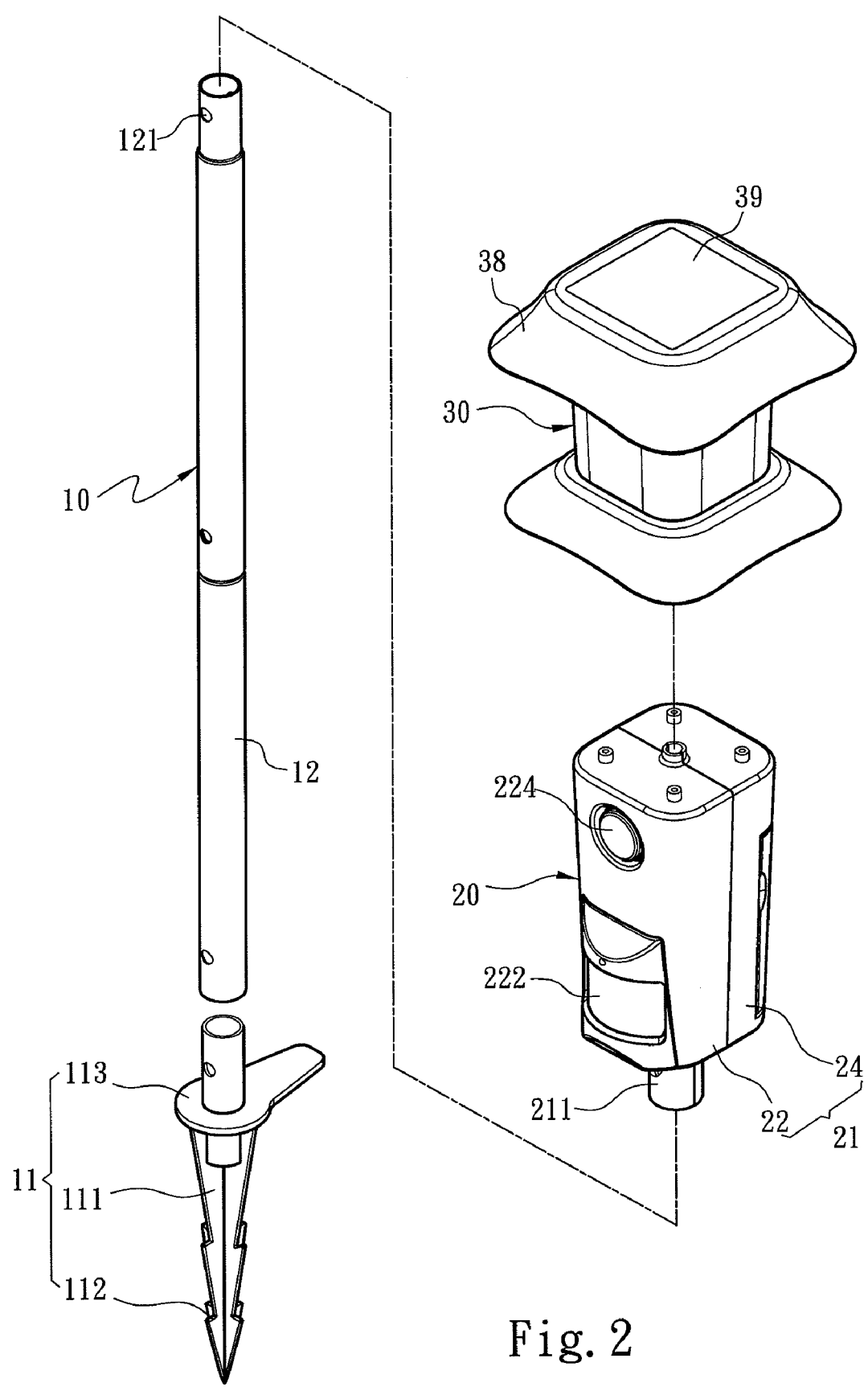
FIG. 2 is an exploded view of the invention.

Please refer to FIGS. 1 and 2, the present invention provides a solar power alarm lamp installed outdoors, such as courtyards, lawns, swimming pools and the like. In addition to providing illumination, it also provides detection and alarm function. The solar power alarm lamp of the invention mainly includes a support post 10, an alarm device 20 located on the support post 10 and a lamp set 30 located on the alarm device 20. The support post 10 has an insertion leg 11 insertable into ground and an extended section 12 connecting to the insertion leg 11. The insertion leg 11 has an insertion portion 111 substantially formed in a vertical fashion and a blocking portion 113. The insertion portion 111 is inserted into the ground and has a check portion 112 to prevent the insertion portion 111 from being drawn out from the ground. The blocking portion 113 butts the ground surface to limit insertion depth while the insertion portion 111 inserting in the ground.

Figure 3:
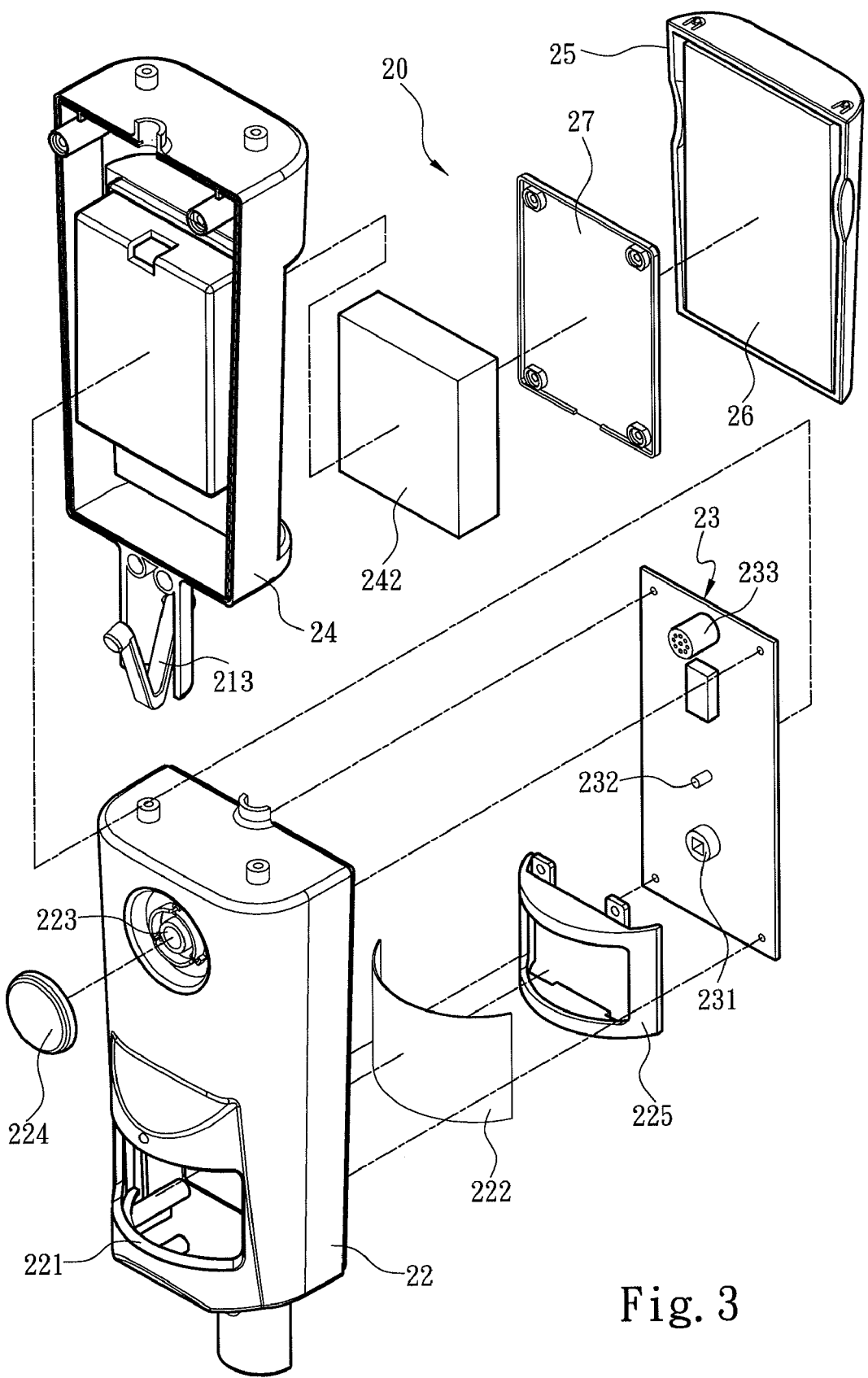
FIG. 3 is an exploded view of an alarm device of the invention.
Figure 4:
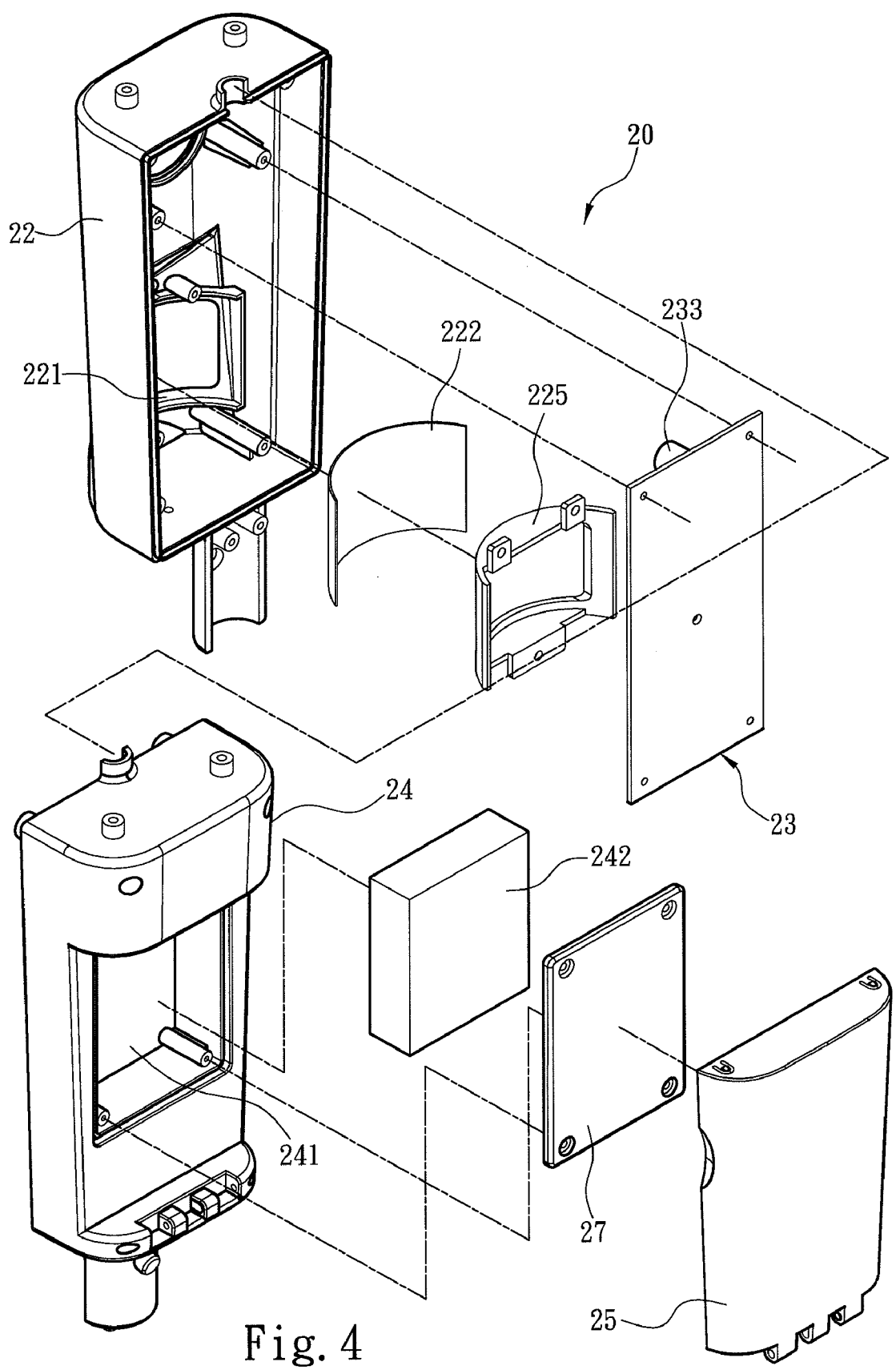
FIG. 4 is another exploded view of the alarm device of the invention.
Figure 5:
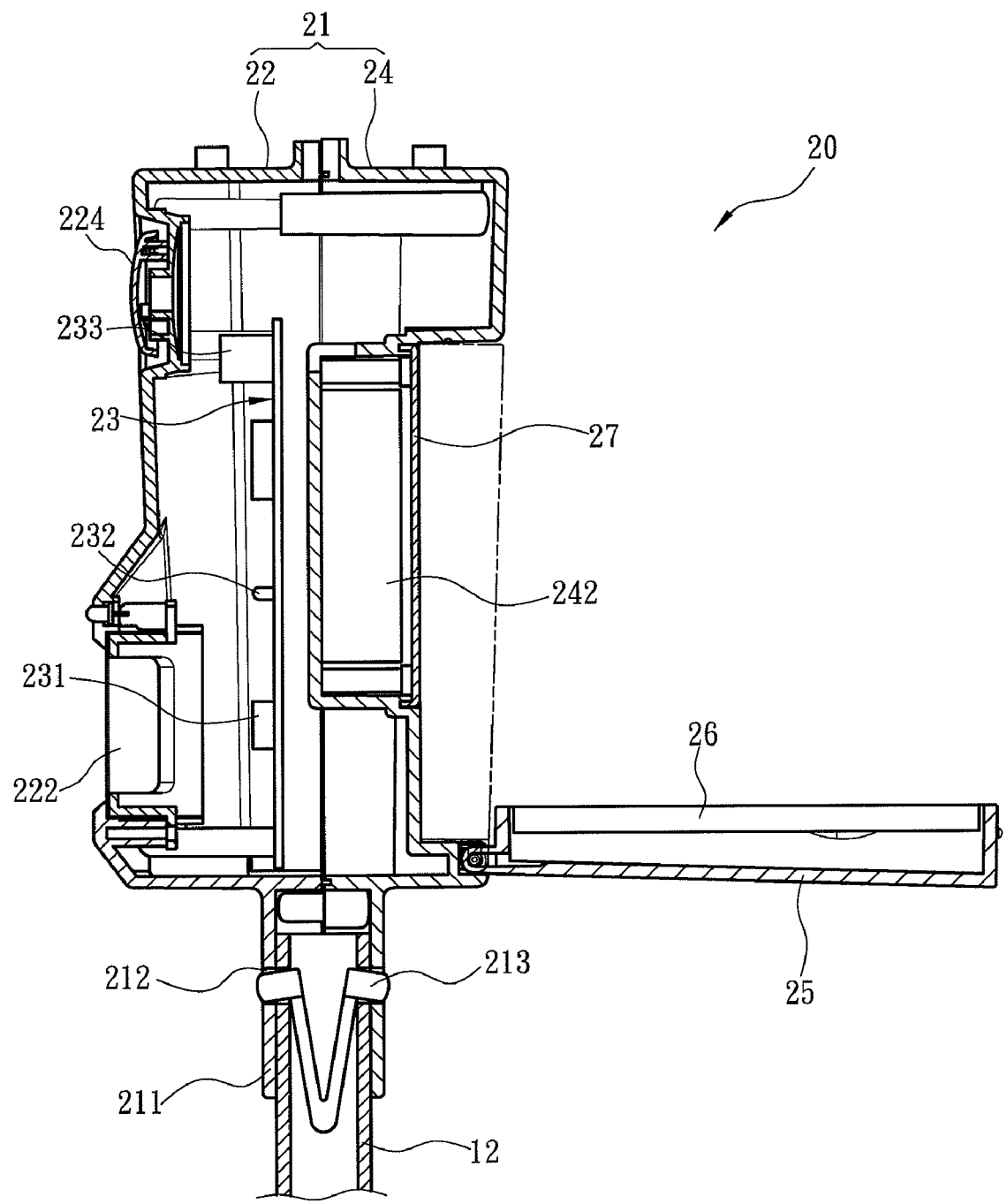
FIG. 5 is a sectional view of the alarm device of the invention.

Referring to FIGS. 3, 4 and 5, the alarm device 20 includes a casing 21 connected to the extended section 12. The casing 21 has a bushing 211 coupled on the extended section 12. The bushing 211 and extended section 12 have respectively a fastening hole 212 and 121 latched by a fastening element 213 to form secure positioning. The casing 21 includes a first half case 22 and a second half case 24. The first half case 22 holds a circuit board 23 which has a PIR sensor 231, a microwave sensor 232 and a buzzer 233 to send out an alarm. The PIR sensor 231 and the microwave sensor 232 generate respectively infrared rays and microwave to detect surrounding environments to enhance detection accuracy. The buzzer 233 sends out the alarm to achieve alert effect. The first half case 22 has a first opening 221 corresponding to the PIR sensor 231 and a cover 222 located on the first opening 221 and a butting member 225 to butt the cover 222 on the first opening 221 in a secure manner. The first half case 22 also has a second opening 223 corresponding to the buzzer 233 and a buzzer cap 224 located on the second opening 223. The second half case 24 is pivotally coupled with a lid 25. There is a first solar panel 26 located on the lid 25. The lid 25 is pivoted against the casing 21 to an open position to allow the first solar panel 26 to receive solar power and convert the solar power into electric power. The second half case 24 further has a housing compartment 241 on the lid 25 pivoted against the second half case 24 to a closed position to hold a charge battery 242 and a fending plate 27 to seal the housing compartment 241.

Figure 6:
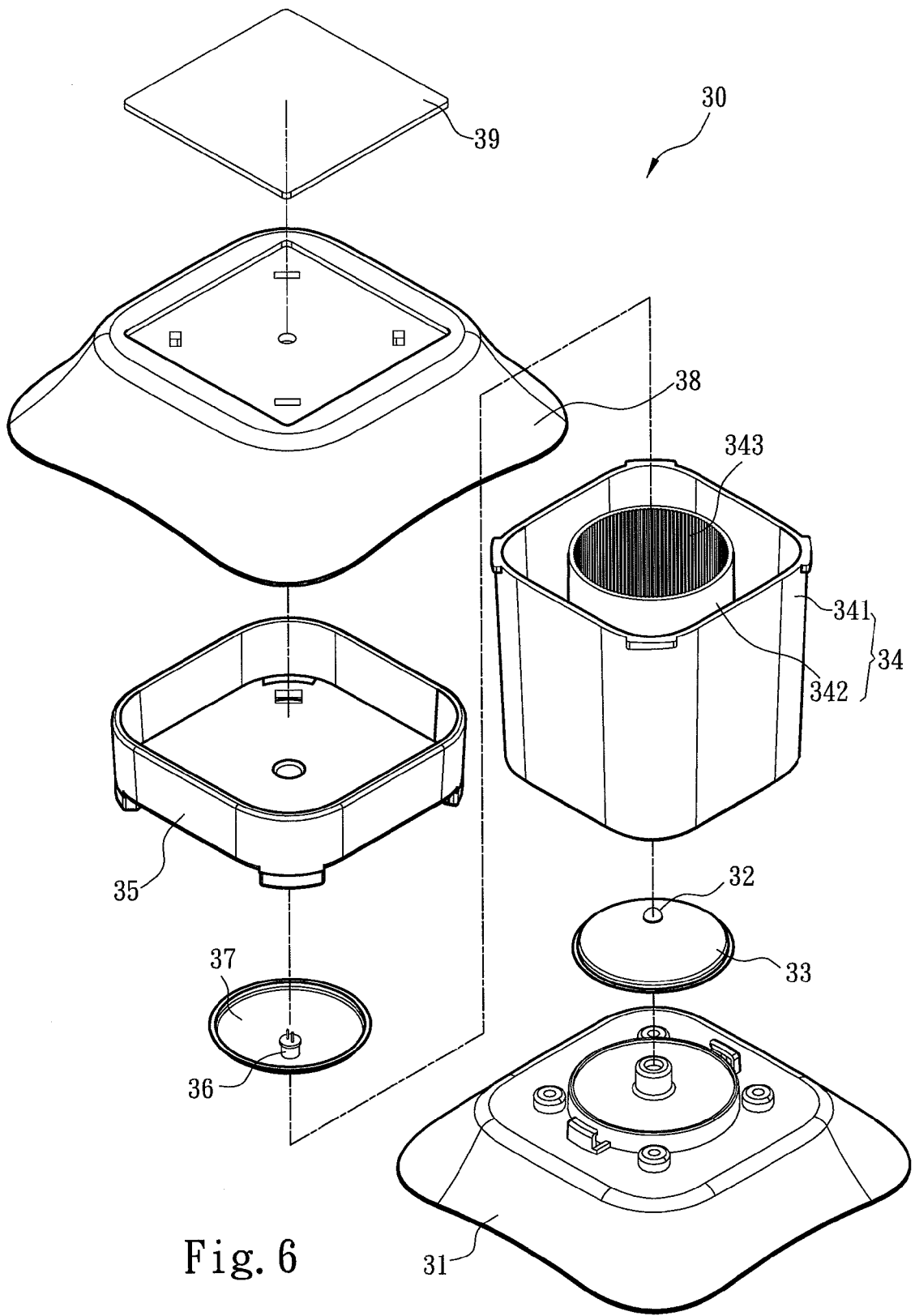
FIG. 6 is an exploded view of a lamp set of the invention.
Figure 7:
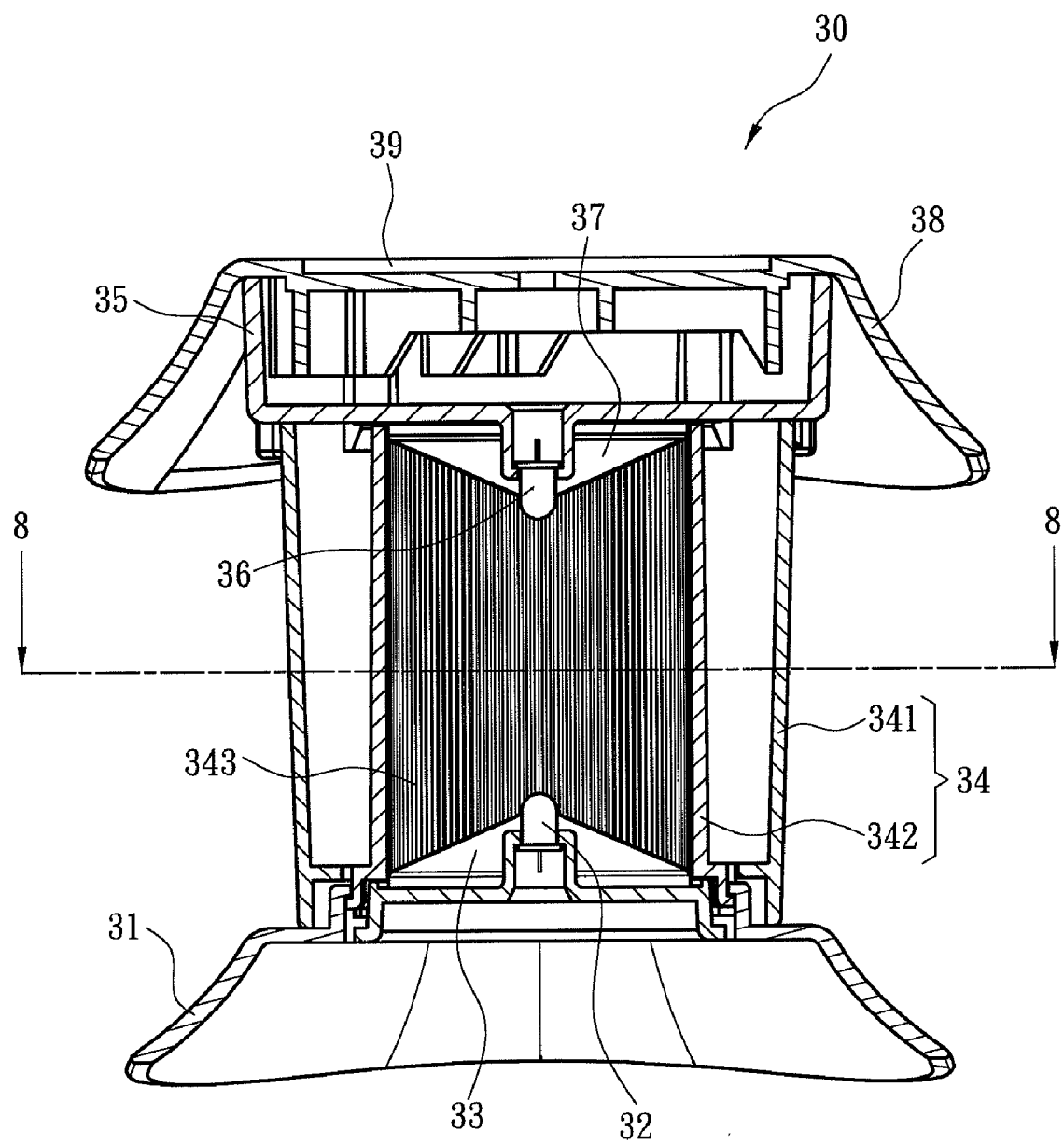
FIG. 7 is a sectional view of the lamp set of the invention.
Figure 8:
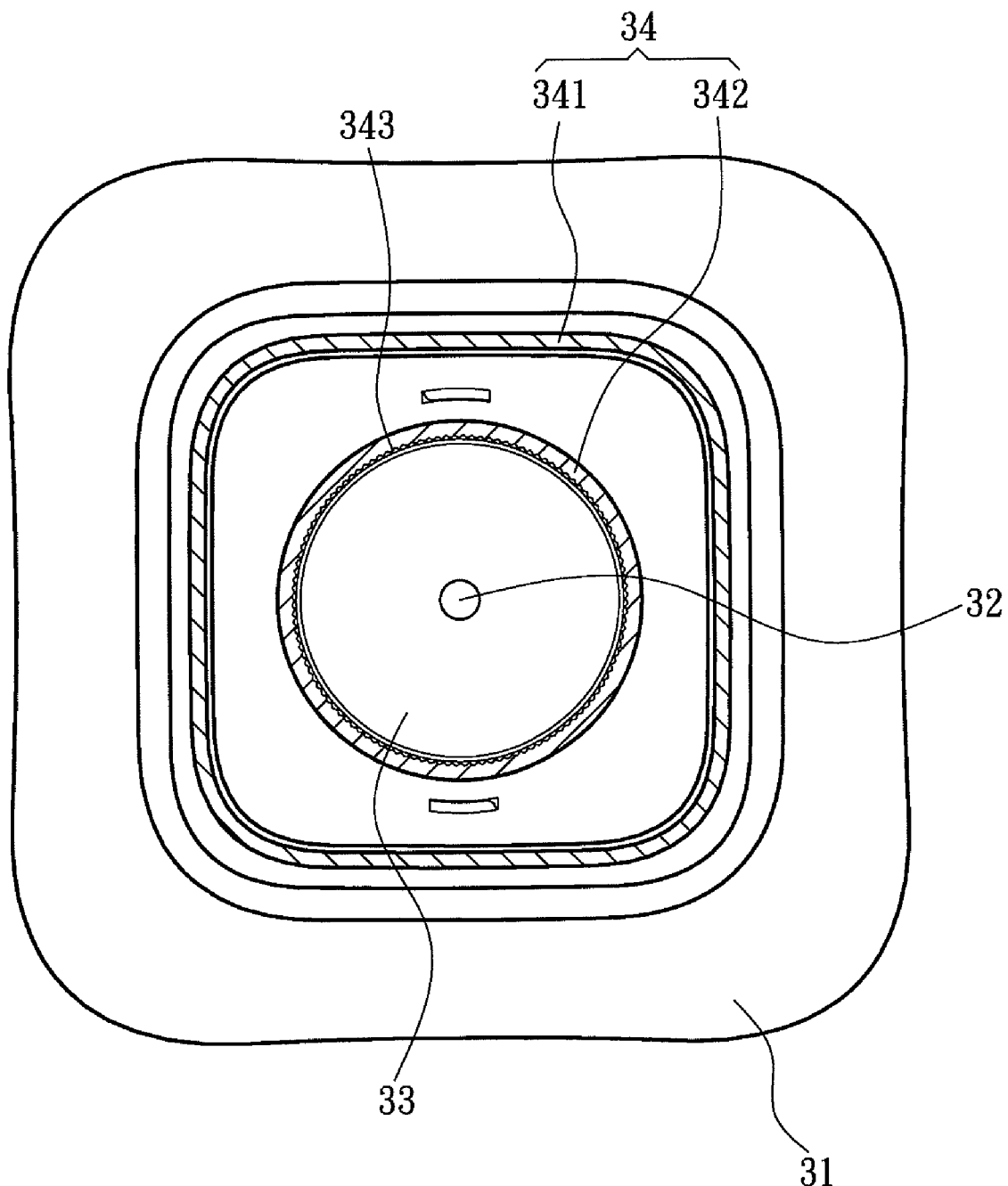
FIG. 8 is another sectional view of the lamp set of the invention.

Referring to FIGS. 6, 7 and 8, the lamp set 30 includes a first lamp holder 31 connected to the alarm device 20, a lamp shade 34 located on the first lamp holder 31 and a second lamp holder 35 located on the lamp shade 34. The first and second lamp holders 31 and 35 hold respectively a lighting element 32 and 36 and a reflection hood 33 and 37 coupled respectively with the lighting elements 32 and 36. The reflection hoods 33 and 37 are formed in a conical shape to reflect light generated by the lighting elements 32 and 36. The lamp shade 34 has a first light penetration shade 341 and a second light penetration shade 342 located inside the first light penetration shade 341. The second light penetration shade 342 has two ends respectively cover the lighting elements 32 and 36. The second light penetration shade 342 has an undulant structure 343 on an inner wall to generate multiple reflections and refractions upon receiving the light reflected by the reflection hoods 33 and 37 from the lighting elements 32 and 36 to enhance luminosity, then the light is projected outwards through the first light penetration shade 341. The second lamp holder 35 has a bracing dock 38 to hold a second solar panel 39 to receive solar power and convert the solar power into electric power.

As a conclusion, the support post 10 of the invention is inserted into the ground without any aid of tools. Installation can be accomplished quickly and easily. When light is available, the first and second solar panels 26 and 39 can convert solar power into electric power needed to enable the PIR sensor 231, microwave sensor 232, buzzer 233 and the lamp set 30 to operate normally, and also can charge the charge battery 242. When the light is absent, the charge battery 242 provides electric power to the circuit board 23 and the lamp set 30. Thus the solar power alarm lamp does not require external electric power, and can convert solar power into electric power, therefore can save energy and is eco-friendly.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A solar power alarm lamp, comprising:
a support post which includes an insertion leg insertable into ground and an extended section connected to the insertion leg;
an alarm device which includes a casing connected to the extended section to hold a circuit board, the circuit board including a passive infrared sensor, a microwave sensor and a buzzer to send out an alarm, the casing being pivotally coupled with a lid which holds a first solar panel and is pivoted against the casing to an open position to allow the first solar panel to receive solar power and convert the solar power into electric power; and
a lamp set which includes a first lamp holder connected to the alarm device, a lamp shade located on the first lamp holder and a second lamp holder located on the lamp shade, the first lamp holder and the second lamp holder including respectively a lighting element, and the second lamp holder including a bracing dock to hold a second solar panel.

2. The solar power alarm lamp of claim 1, wherein the insertion leg includes an insertion portion insertable into the ground and a blocking portion to butt the ground surface to limit insertion depth while the insertion portion inserting in the ground.

3. The solar power alarm lamp of claim 2, wherein the insertion portion includes a check portion to prevent the insertion portion from being drawn out from the ground.

4. The solar power alarm lamp of claim 1, wherein the casing includes a bushing coupled on the extended section, the bushing and the extended section including respectively a fastening hole corresponding to each other and latched by a fastening element to form secure positioning thereof.

5. The solar power alarm lamp of claim 1, wherein the casing includes a first half case and a second half case.

6. The solar power alarm lamp of claim 5, wherein the first half case holds the circuit board and the lid is hinged on the second half case.

7. The solar power alarm lamp of claim 6, wherein the first half case includes a first opening corresponding to the passive infrared sensor and a cover located on the first opening.

8. The solar power alarm lamp of claim 7, wherein the first half case includes a butting member to butt and hold the cover on the first opening.

9. The solar power alarm lamp of claim 6, wherein the first half case includes a second opening corresponding to the buzzer and a buzzer cap located on the second opening.

10. The solar power alarm lamp of claim 6, wherein the second half case includes a housing compartment corresponding to the lid at a closed position to hold a charge battery and a fending plate to seal the housing compartment.

11. The solar power alarm lamp of claim 1, wherein the first lamp holder and the second lamp holder include respectively a reflection hood connected to the lighting elements to reflect light generated by the lighting elements.

12. The solar power alarm lamp of claim 11, wherein the reflection hood is formed in a conical shape.

13. The solar power alarm lamp of claim 1, wherein the lamp shade includes a first light penetration shade and a second light penetration shade located in the first light penetration shade, the second light penetration shade including two ends which respectively cover the lighting elements.

14. The solar power alarm lamp of claim 13, wherein the second light penetration shade includes an undulant structure on an inner wall to enhance luminosity.

* * * * *